US011929216B1

(12) United States Patent
Hsieh et al.

(10) Patent No.: US 11,929,216 B1
(45) Date of Patent: Mar. 12, 2024

(54) KEYBOARD BUTTON WITH A THIN SHEET SPRING DESIGN

(71) Applicant: DELL PRODUCTS L.P., Round Rock, TX (US)

(72) Inventors: Minghao Hsieh, New Taipei (TW); Chia-Chen Lin, New Taipei (TW); Jer-Yo Lee, Taipei (TW); Po-Fei Tsai, New Taipei (TW); Chang-Hsin Chen, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/966,667

(22) Filed: Oct. 14, 2022

(51) Int. Cl.
*H01H 13/7073* (2006.01)

(52) U.S. Cl.
CPC ................................ *H01H 13/7073* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

| | | | | |
|---|---|---|---|---|
| 10,784,062 | B2 * | 9/2020 | Wang | G06F 1/1656 |
| 11,314,336 | B2 | 4/2022 | Morrison et al. | |
| 2011/0114461 | A1 * | 5/2011 | Chen | H01H 13/705 200/344 |
| 2014/0284193 | A1 * | 9/2014 | Chou | H01H 13/705 200/5 A |
| 2021/0166894 | A1 * | 6/2021 | Hsu | H01H 13/04 |
| 2021/0240281 | A1 | 8/2021 | Knoppert et al. | |

* cited by examiner

*Primary Examiner* — Ahmed M Saeed
(74) *Attorney, Agent, or Firm* — Larson Newman, LLP

(57) ABSTRACT

A button mechanism includes a button, a module, and a thin sheet spring. The thin sheet spring is in physical communication with the button and with the module. The thin sheet spring exerts a tension force on the button and the module to bias the button toward a normal position. In response to a force greater than the tension force being exerted on the button, a portion of the thin sheet stretches to enable the button to be placed in a contact position. In response to the force being removed from the button, the tension force causes the thin sheet to snap back to an original position and biases the button toward the normal position.

14 Claims, 4 Drawing Sheets

KEYBOARD BUTTON WITH A THIN SHEET SPRING DESIGN

FIELD OF THE DISCLOSURE

This disclosure generally relates to information handling systems, and more particularly relates to a keyboard button with a thin sheet spring design.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A button mechanism includes a button, a module, and a thin sheet spring. The thin sheet spring is in physical communication with the button and with the module. The thin sheet spring may exert a tension force on the button and the module to bias the button toward a normal position. In response to a force greater than the tension force being exerted on the button, a portion of the thin sheet may stretch to enable the button to be placed in a contact position. In response to the force being removed from the button, the tension force may cause the thin sheet to snap back to an original position and bias the button toward the normal position.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
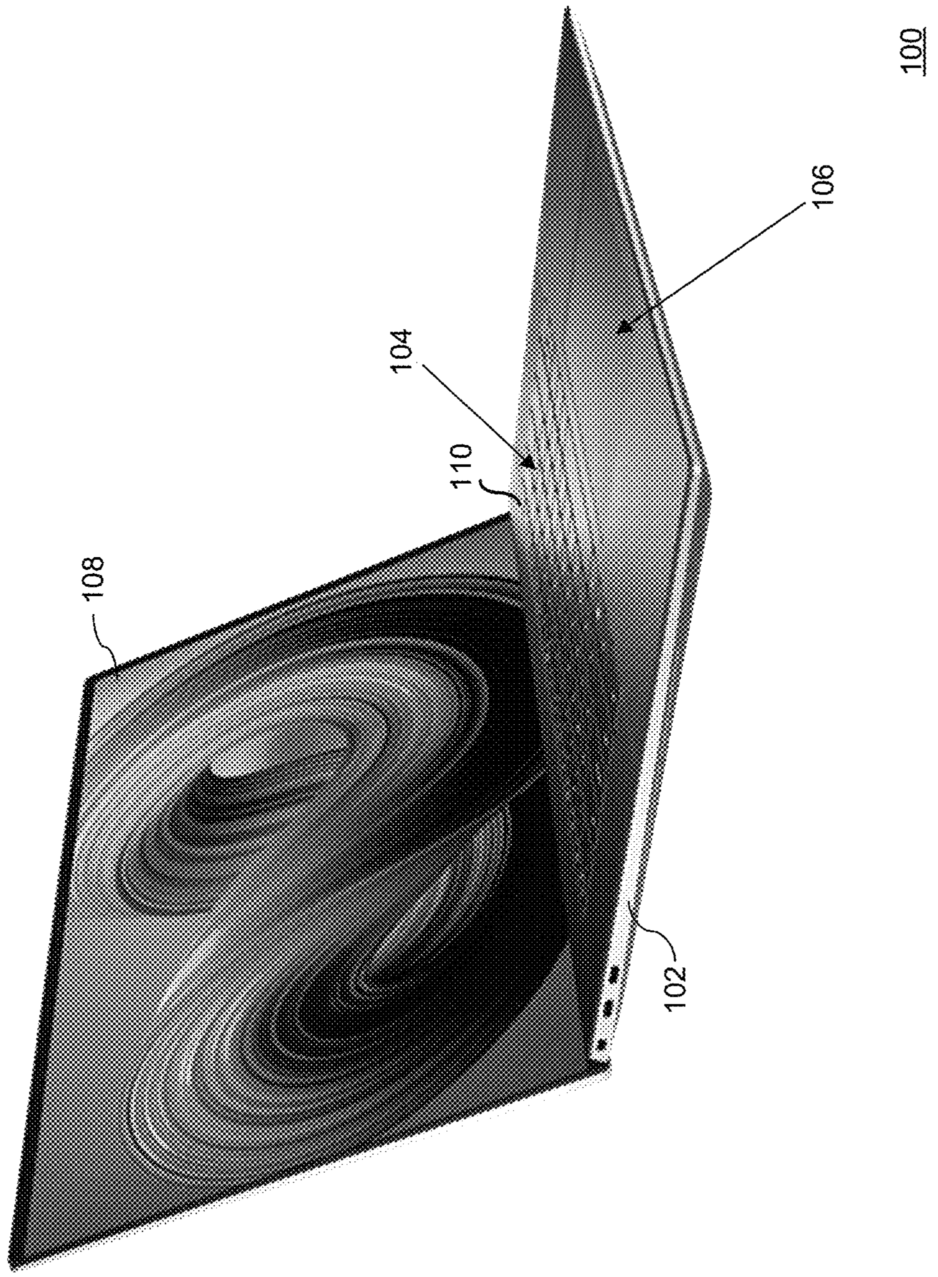
FIG. 1 is a perspective view of an information handling system according to an embodiment of the present disclosure.

FIG. 1 shows a display 100 of an information handling system according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), blade server or rack server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100, such as a mobile laptop computer, includes an outer enclosure 102, a keyboard 104, a touchpad 106, and the display 108. Keyboard 104 includes any suitable number of keys or buttons including, but not limited to, a power button 110. In previous information handling systems, buttons, such as power buttons, may include plastic holders to prevent a pre-press or mis-trigger of the button. However, different configurations of the plastic holders created different issues. For example, a short arm for the plastic holder reduced the size of the plastic holder and button but the short arm required a larger bending force to trigger the button. A long arm for the plastic holder required less bending force but a larger area of the keyboard was consumed by buttons with plastic holders having longer arms. In previous information handling systems, the arms of the plastic holder may be created by injection molding, which in turn may cause small deformation in the plastic holder and may cause misalignment issues for the button.

Figure 2:
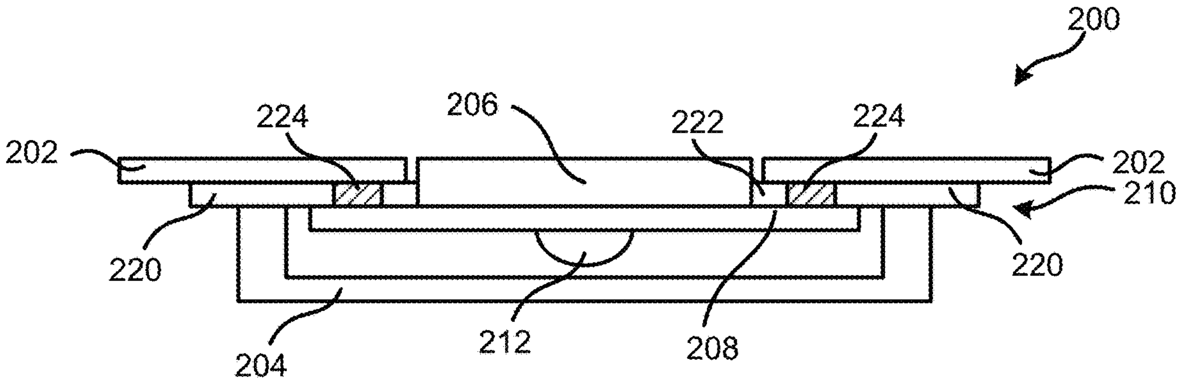
FIGS. 2 and 3 are cross sectional views of a button mechanism according to an embodiment of the present disclosure.
Figure 3:
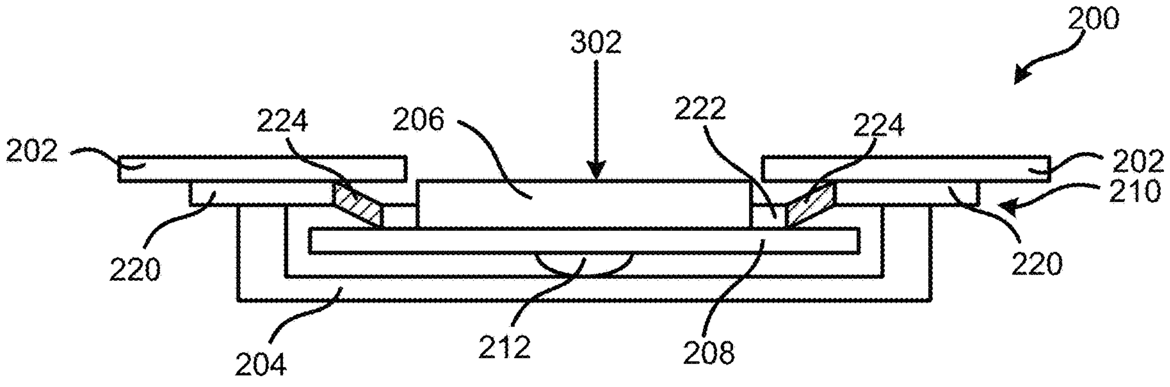

FIGS. 2 and 3 show a button mechanism 200 and a portion of a c-cover 202 according to an embodiment of the present disclosure. Button mechanism 200 includes a bracket 204, a button 206, a module 208, a thin sheet spring 210, and a contact dome 212. Thin sheet spring 210 includes a main portion 220, a body portion 222, and multiple leg portions 224. Thin sheet spring 210 is in physical communication with c-cover 202, bracket 204, and module 208. In certain examples, main portion 220 of thin sheet spring 210 may be secured to c-cover 202 and body portion 222 of the thin sheet may be secured to module 208 via any suitable means, such as an adhesive. Thin sheet spring 210 may be any suitable material that is thin, highly flexible in response to a force being exerted on it, and may snap back to its original shape when the force is removed. For example, thin sheet spring 210 may be a mylar sheet.

In an example, thin sheet spring 210 may bias button 206 toward a normal or resting position. For example, thin sheet spring 210 may exert enough force on module 208 to hold a top surface of button 206 substantially parallel with a top surface of c-cover 202 as shown in FIG. 2. While button 206 is biased toward the normal position, main portion 220, body portion 222, and leg portions 224 of thin sheet spring 210 may all be substantially parallel. Additionally, thin sheet spring 210 may hold module 108 a particular distance above a bottom of bracket 204, such that contact dome 212 is not in physical communication with the bracket.

In certain examples, if button 206 is a lighting power button with a lighting module, then a button opening, such as button opening 408, may required to let light pass from a light module below button mechanism 200. However, if button 206 is a normal power button without a lighting feature, then a button opening, such as button opening 408, may not be required and button 206 can be placed directly on body portion 222 of thin sheet spring 210.

Referring to FIG. 3, a force may be exerted on button 206 in the direction of arrow 302, and based on the force leg portions 224 may stretch to enable the top surface of the button to be pushed below the top surface of c-cover 202 as shown in FIG. 3. In an example, the force in the direction of arrow 302 may be greater than the force from thin sheet spring 210 to place the button in a contact position so that contact dome 212 may be placed in physical communication with bracket 204. In certain examples, the compression of contact dome 212 in between module 208 and bracket 204 may result in a signal being sent to a processor, such as processor 602 or 604 in FIG. 6, and the signal may indicate for the processor to transition a power state of the information handling system. For example, the power state may transition from a powered on state to a powered down state, or transition from a powered down state to a powered on state. In certain examples, the signal from button mechanism 200 may cause a processor to perform any predetermined function or operation without varying from the scope of this disclosure.

Based on the force in the direction of arrow 302 being removed from button 206, thin sheet spring 210 may snap back to its original shape. In response to thin sheet spring 210 snapping back, the thin sheet spring may exert a force on button 206 and module 208 and the force may move and bias the button toward the normal position. In certain examples, the force in the direction of arrow 302 may be less than a force needed in previous button mechanisms utilizing plastic arms and button mechanism 200 may have a higher click ratio than these previous button mechanisms.

Figure 4:
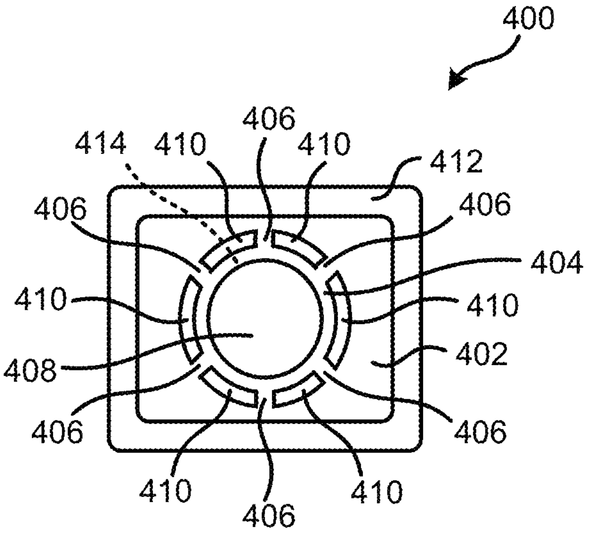
FIG. 4 is a diagram of a thin sheet spring according to an embodiment of the present disclosure.

FIG. 4 is a diagram of a thin sheet spring 400 according to an embodiment of the present disclosure. In an example, thin sheet spring 400 may be substantially similar to thin sheet 210 of FIGS. 2 and 3. Thin sheet spring 400 includes a main portion 402, a body portion 404, leg portions 406, and a button opening 408. In certain examples, thin sheet spring 400 may not include button opening 408, and body portion 404 may extend across the center of thin sheet spring 400. In this situation, a button, such as button 206, may be placed in physical communication with body portion 404. In an example, leg portions 406 may be created by multiple holes 410 located within main portion 402. Thin sheet spring 400 also includes adhesive portions 412 and 414.

In certain examples, holes 410 may be located around and in substantially the same shape as button opening 408. For example, if button opening 408 is a circular shape, holes 410 may be orientated in a circular shape as well. If button opening 408 is a square or a rectangle shape, holes may be orientated respectively in a square or rectangle shape. In certain examples, button opening 408 may let light pass through thin sheet spring 400 when button 206 is a lighting power button with a lighting module below button mechanism 200.

In an example, each leg portion 406 may be a different section of thin sheet spring 400 extending from main portion 402 in between two holes 410 to body portion 404. In certain examples, different widths of leg portions 206 may change a tension force of thin sheet spring 400 to hold or bias a button in the normal position. For example, the wider leg portion 206, the more tension force of thin sheet spring 400 that a downward force needs to overcome to activate the button mechanism.

In certain examples, the size of holes 410 may affect an amount of water or dust that may get within button mechanism 200 of FIG. 2. For example, as the size of holes 410 get smaller water and rust proof properties of button mechanism 200 increase. In an example, adhesive portion 412 may be located around the outer edge of main portion 402. In certain examples, adhesive portion 414 may be located around body portion 404, and on an opposite surface of thin sheet spring 400 as compared to adhesive portion 412. Adhesive portion 412 may securely connect thin sheet spring 400 to a c-cover of an information handling system, such as c-cover 202 of FIG. 2, and adhesive portion 414 may securely connect the thin sheet to module 208 of FIG. 2. In an example, adhesive portion 412 may securely connect thin sheet spring 402 to a module, such as module 208 of FIG. 2, and adhesive portion 414 may securely connect the thin sheet spring to a button, such as button 206 of FIG. 2. In this example, adhesive portions 412 and 414 may hold button 206 and module 208 together.

Figure 5:
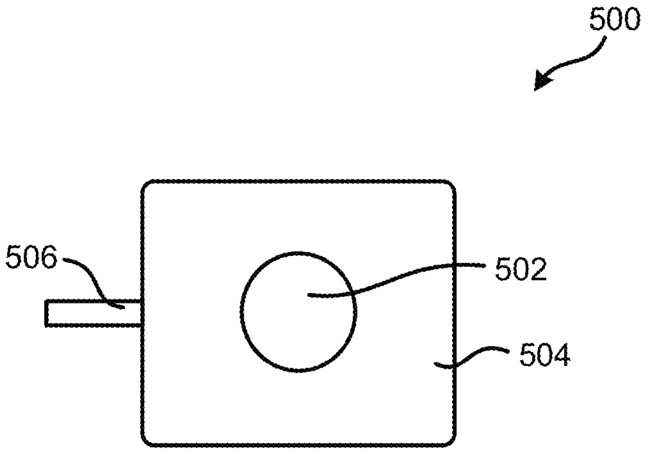
FIG. 5 is a diagram of a button component according to an embodiment of the present disclosure.

FIG. 5 illustrates a button component 500 according to an embodiment of the present disclosure. Button component 500 includes a button 502, a module 504, a cable 506, and a contact dome, such as contact dome 212 of FIG. 2. In certain examples, button 502 may be substantially similar to button 206 of FIG. 2, and module 504 may be substantially similar to module 208 of FIG. 2. In an example, button 502 may be substantially the same size and shape as button opening 408 of thin sheet spring 400 in FIG. 4. For example, button 502 may be a circular shape, a square shape, a rectangular shape, an alien head shape, or the like. In certain examples, cable 506 may provide a signal indicating that contact dome has been compressed as described above with respect to FIG. 3.

Figure 6:
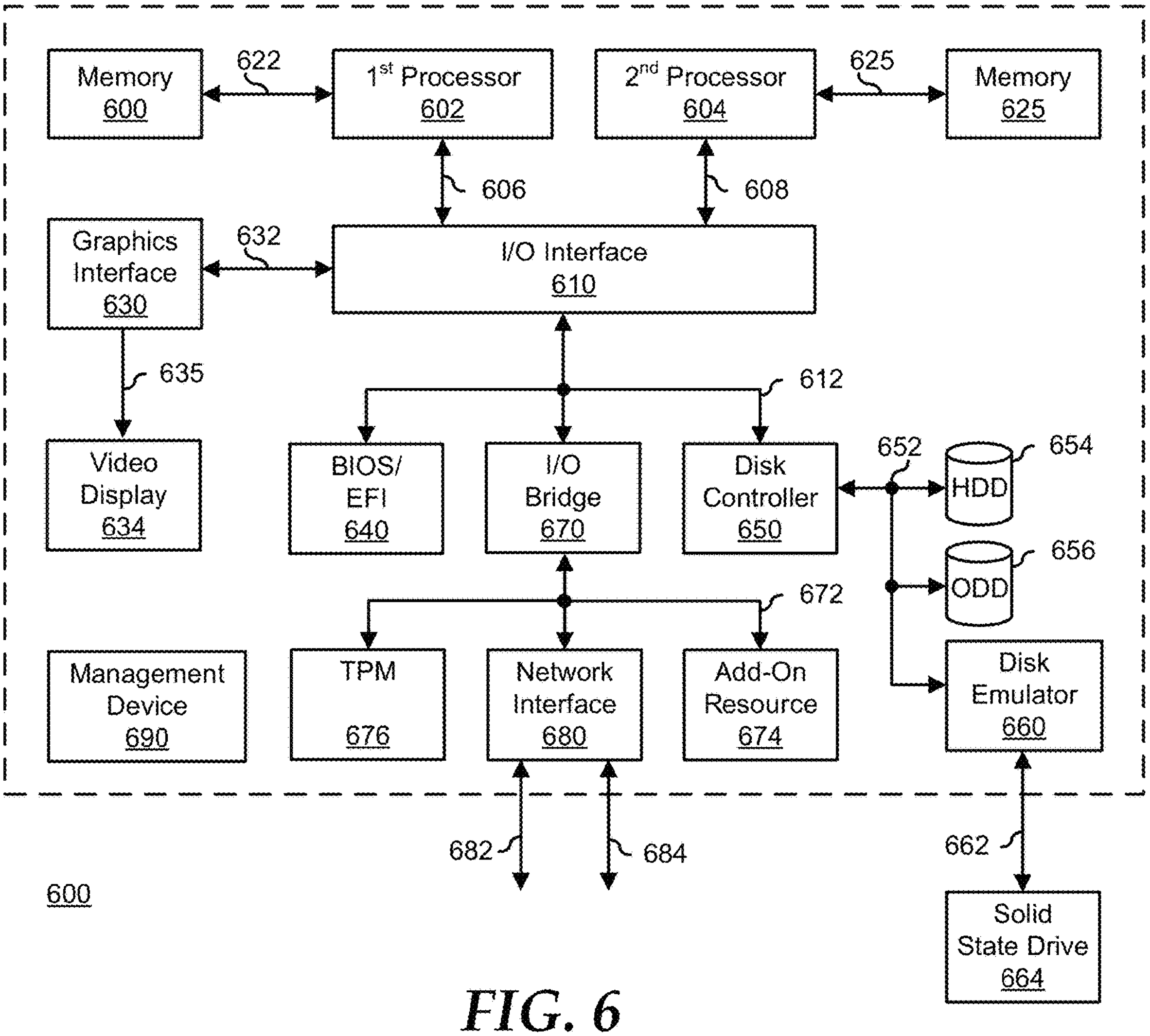
FIG. 6 is a block diagram of a general information handling system according to an embodiment of the present disclosure.

FIG. 6 shows a generalized embodiment of an information handling system 600 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 1695. Processors 602 and 604, I/O interface 610, memory 620, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632 and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 3394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612 or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600.

Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A button mechanism comprising:

a button;

a module in physical communication with the button; and a thin sheet spring in physical communication with the button and with the module, the thin sheet spring to exert a tension force on the button and the module to bias the button toward a normal position, in response to a force greater than the tension force being exerted on the button, a portion of the thin sheet stretches to enable the button to be placed in a contact position, and in response to the force being removed from the button, the tension force causes the thin sheet to snap back to an original position and to bias the button toward the normal position, wherein the thin sheet spring includes a button opening that is a same shape and a same size as the button, and a plurality of holes located around and in a same shape as the button opening, wherein each leg portion is created by a different set of holes.

2. The button mechanism of claim 1, wherein the thin sheet includes a main portion, leg portions, and a body portion, wherein the leg portions stretch to enable the button to be placed in the contact position.

3. The button mechanism of claim 2, wherein the thin sheet spring further includes an adhesive portion located around an outer edge of the main portion, wherein the adhesive portion securely connects the thin sheet spring to the module.

4. The button mechanism of claim 2, wherein the thin sheet spring further includes an adhesive portion located on the body portion, wherein the adhesive portion securely connects the thin sheet spring to the button.

5. The button mechanism of claim 2, wherein the leg portions snap back the original position to when the force is no longer exerted on the button.

6. The button mechanism of claim 1, wherein the thin sheet spring is a thin mylar sheet.

7. An information handling system, comprising:
a c-cover;
a keyboard in physical communication with the c-cover; and
a button mechanism located as part of the keyboard, the button mechanism including:
a button including a top surface to be placed in parallel with a top surface of the c-cover when the button is in a normal position;
a module in physical communication with the button; and
a thin sheet spring in physical communication with the button and with the module, the thin sheet spring to exert a tension force on the button and the module to bias the button toward the normal position, in response to a force greater than the tension force being exerted on the button, a portion of the thin sheet to stretch to enable the button to be placed in a contact position, and in response to the force being removed from the button, the tension force to cause the thin sheet to snap back to an original position and to bias the button toward the normal position, wherein the thin sheet spring includes a button opening that is a same shape and a same size as the button, and a plurality of holes located around and in a same shape as the button opening, wherein each leg portion is created by a different set of holes.

8. The information handling system of claim 7, wherein the thin sheet includes a main portion, leg portions, and a body portion, wherein the leg portions stretch to enable the button to be placed in the contact position.

9. The information handling system of claim 8, wherein the thin sheet spring further includes an adhesive portion located around an outer edge of the main portion, wherein the adhesive portion securely connects the thin sheet spring to the module t.

10. The information handling system of claim 8, wherein the thin sheet spring further includes an adhesive portion located on the body portion, wherein the adhesive portion securely connects the thin sheet spring to the button.

11. The information handling system of claim 8, wherein the leg portions snap back the original position to when the force is no longer exerted on the button.

12. The information handling system of claim 7, wherein the thin sheet spring is a thin mylar sheet.

13. A button mechanism comprising:
a button;
a module in physical communication with the button; and
a thin sheet spring in physical communication with the button and with the module, the thin sheet spring including:
a main portion and a body portion;
a first adhesive portion located around an outer edge of the main portion, wherein the first adhesive portion securely connects the thin sheet spring to the module;
a plurality of leg portions each extending from the main portion to the body portion, the leg portions to exert a tension force on the button and the module to bias the button toward a normal position, in response to a force greater than the tension force being exerted on the button, the leg portions stretch to enable the button to be placed in a contact position, and in response to the force being removed from the button, the tension force to cause the thin sheet to snap back to an original position and to bias the button toward the normal position;
a button opening that is a same shape and a same size as the button; and
a plurality of holes located around and in a same shape as the button opening, wherein each leg portion is created by a different set of holes.

14. The button mechanism of claim 13, wherein the thin sheet spring further includes a second adhesive portion located on the body portion, wherein the second adhesive portion securely connects the thin sheet spring to the button.

* * * * *